3,428,176
MEANS FOR DETECTING FILTER
CAKE BUILDUP
James T. Reneau, Jr., Conroe, Tex., assignor to Sparkler Manufacturing Company, Conroe, Tex., a corporation of Illinois
Filed Apr. 25, 1967, Ser. No. 633,577
U.S. Cl. 210—86     15 Claims
Int. Cl. B01d 35/14

ABSTRACT OF THE DISCLOSURE

A filter vessel having a filter plate therein, and a probe through the wall of the vessel generally perpendicular to the filter plate. A flat member on the end of the probe generally parallel to the plate, the flat member being spring-biased to a first position with respect to the probe toward said plate, but being capable of moving to a second position with respect to the probe, away from said plate, upon meeting sufficient resistance. Motive means for gradually moving said probe and flat member toward and away from said plate, so that when sufficient filter cake builds up on the filter plate, the flat area will be moved to its second position relative to the probe, thereby actuating a switch or the like.

---

Industrial filtration processes are customarily carried out in large pressurized vessels having therein a number of filter plates arranged in generally parallel orientation. Each such filter plate typically comprises a pair of spaced-apart filtering means through which the fluid to be filtered flows into a chamber on the interior of the filter plate. The interior chamber of each plate is connected to a manifold or the like which enters through a wall of the vessel, and which serves to remove the filtered fluid from the vessel. In one embodiment which is commonly used, a plurality of filter plates is employed, and each plate is vertically oriented in the filtering vessel.

As fluid flows through the filtering means on each filter plate, into the interior chamber of the plate, suspended matter in the fluid which cannot pass through the filtering means is of course deposited on the filtering means. This deposit is the filter cake which gradually builds up and, as it does, begins to render the filtration process inefficient. When the face of the filtering means becomes clogged with filter cake, the effective area of filtration is reduced, and the pressure differential which provides the impetus for the filtering action becomes smaller and smaller. The point is soon reached at which the operation is no longer efficient, and when the process is continued there may be no filtering action at all.

In such processes, the problem exists of determining when the cake on the filter plates has built up to such a point that the filtration process is no longer efficient. In the past, there has never been a satisfactory method of making this determination.

Since the filtering vessel is a closed system, it is not possible to make this determination by visual observation. One method which has been generally used in the prior art is to make this determination by means of pressure measurement inside the tank. But this leaves a lot to be desired because the measurement is often awkward to make and furthermore the determination is imprecise. The imprecision is due to the fact that pressure differentials are sometimes subject to fairly rapid fluctuations, and may be caused by factors other than cake buildup on the filter plates. A further and very important disadvantage in relying on pressure measurements is that a worker must be present to observe the readings. In short, determination of cake thickness by means of pressure measurements is inefficient and generally unsatisfactory.

The present invention provides a means for determining cake buildup which is *directly* related to the actual cake thickness and subject to no error in translation. Further, the means provided by the present invention is automatic and does not require the observance of an operator. Rather, means are provided to automatically notify of cake buildup.

Further, the means provided by the present invention may be adjusted so that notification may be given of any desired cake thickness on a filter plate.

In order that the invention may be more clearly understood, reference will be made in the description which follows to the drawings, which illustrate one embodiment of the invention and which form a part of this specification, and wherein.

Figure 1:
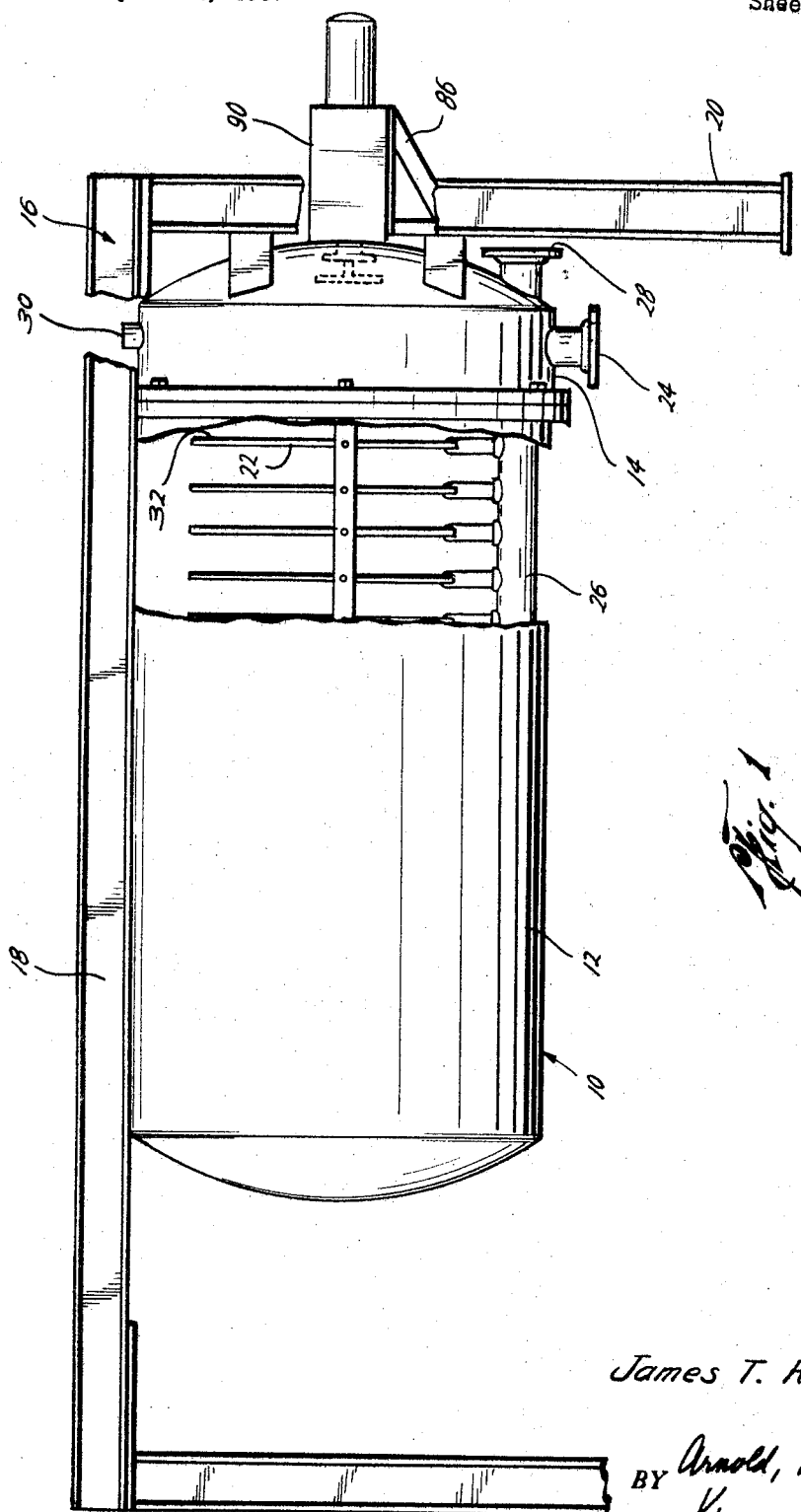
FIGURE 1 is a side view of a filtering vessel including apparatus according to one embodiment of this invention.

Referring now in more detail to the drawings, there is seen in FIGURE 1 a filtering vessel 10, which comprises generally a filter tank 12 and a removable cover 14. The cover and tank body may be separated in any convenient manner, such as that described in the copending application of A. C. Kracklauer, Ser. No. 366,229. Also, the vessel 10 may be supported in any convenient manner, such as by the support structure 16 illustrated in FIGURE 1, comprising generally an overhead frame member 18 and legs 20.

Disposed in substantially parallel relationship in the vessel 10 are a number of filter plates 22. Each such filter plate 22 comprises a couple of spaced-apart filtering means 32 such as metal screen, cloth, or the like, the area between the filtering means 32 forming an interior chamber 34 into which the filtered fluid may flow. The interior chamber 34 of each such filter plate is connected by suitable outlet or nozzle means to a manifold 26 which exits through a wall of the vessel to form an outlet 28 for withdrawal of filtered fluid from the vessel.

An inlet connection 24 is included for introducing fluid to be filtered into the filtering vessel, and a vent 30 is included to allow the tank to be depressurized at the end of a filtering cycle.

It will be understood that the filtering operation may proceed as follows:

The fluid to be filtered is introduced into the pressurized filtering vessel 10 through the inlet 24. The fluid is urged by pressure differential to pass into the interior chamber 34 of one of the filter plates 22, and thence it passes through the manifold 26 out of the vessel through outlet 28. In the process, of course, the fluid must pass through one of the filtering means 32 on the plate 22, and thereby materials which cannot pass through these filtering means, such as suspended particles in the fluid, will collect on the filtering means 32 to form a filter cake 88. As the filtration process continues, more and more cake builds up on the filter plates, and as it does the filtering means become clogged. This results in the lessening of the pressure differential and consequently subtracts from the momentum of the filtration operation. The filtering operation becomes less and less efficient until finally essentially no effective filtration occurs. At some point in the process, therefore, the filter cake must be removed from the filter plates if the filtration process is to continue.

Figure 2:
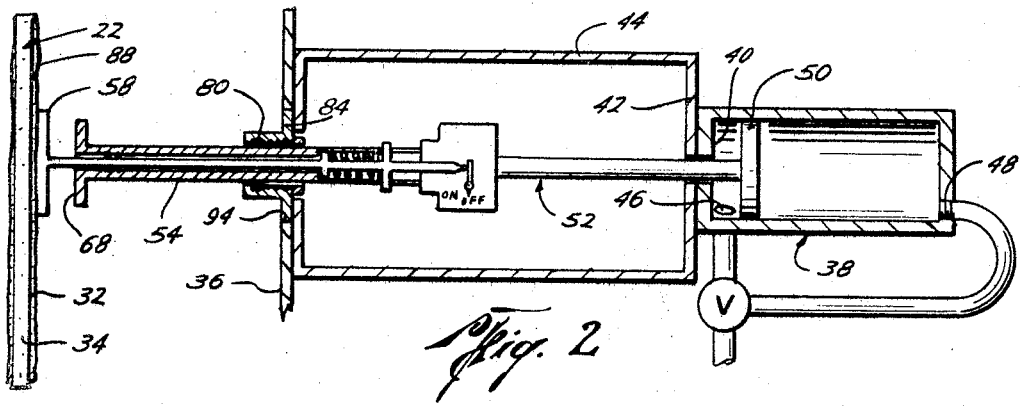
FIGURE 2 is a sectional view of the cake-detecting apparatus shown in FIGURE 1, said apparatus being disposed in a first position in accordance with a method of this invention.
Figure 3:
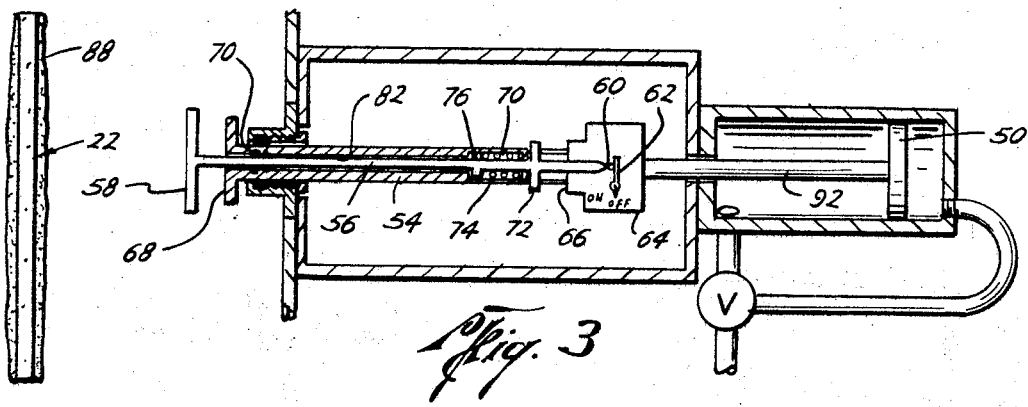
FIGURE 3 is a view similar to FIGURE 2, at another step in a process according to this invention; and, FIGURE 4 is a view similar to FIGURES 2 and 3, at another step in a process according to this invention.
Figure 4:
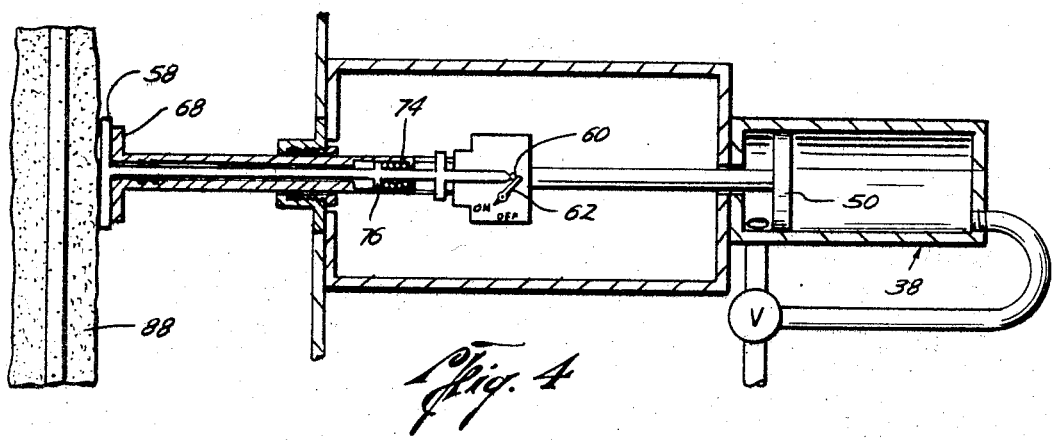

Those skilled in the filtration art know generally what amount of cake buildup may be allowed for any particular process on any particular equipment, before the process becomes nonefficient. But as mentioned above, there is a severe problem of determining *when* this predetermined buildup of cake has been reached. The apparatus illustrated pictorially in FIGURE 1 and in more detail in FIGURES 2–4 is suitable for use in making such a determination.

This cake-detecting apparatus, which is generally indicated at 90, is supported adjacent an end wall 36 of the vessel 10, on a frame 86 which may be affixed to one of the legs 20 of the support structure 16 of the vessel. The details of the apparatus 90 may be more clearly viewed by reference to FIGURES 2–4.

Here it is seen that motive means such as the air cylinder 38 which includes a base 40, is affixed by means of bolts or the like through the base 40 to a mounting plate 42, which is generally parallel to the end wall 36 of vessel 10. Mounting plate 42 is firmly affixed to the wall 36 by any convenient means, such as the mounting legs 44. The air cylinder 38 includes air inlet 46 at the end of the cylinder adjacent the mounting plate, and air inlet 48 at the opposite end of the cylinder. Slidably disposed in the cylinder 38 and operable by pressure differential for longitudinal movement in the cylinder is a piston 50 which is operably connected to an elongate cake detector probe assembly 52, so that as the piston 50 in the air cylinder moves back and forth longitudinally, the detector probe assembly will follow this movement by moving a corresponding distance in the same direction.

The cake detector probe assembly 52 comprises generally an arm member 54 and a probe member or rod 56 concentric with the arm 54 and disposed along the central longitudinal axis thereof. The overall assembly 52, and the arm 54 and rod 56, are each seen to be disposed nonparallel to the filter plate 22. In the illustrated embodiment, these parts are seen to be disposed in a preferred substantially perpendicular relationship with the plate 22.

The cake detector probe assembly 52 is disposed at least partially inside the filtering vessel 10. In some embodiments it may be desirable to locate it entirely within the vessel, but it will probably be preferred to position the assembly as in the illustrated embodiment, with the assembly partially inside and partially outside the vessel 10.

The arm 54 of this assembly is generally cylindrical in configuration, with a bore 82 along the central longitudinal axis thereof. The arm 54 is of such a length that the end opposite the air cylinder 38 fits inside the vessel 10, through a suitable hole 94 in the tank wall 36. This end of the arm 54 is provided with an abutting plate 68, which prevents the arm 54 from sliding through the tank wall 36.

At a point axially spaced from the abutting plate 68, the arm 54 is integral with a housing 64 in which is contained a switch 62. Housing 64 is joined to piston 50 as by the connecting member 92. The housing 64 and connecting member 92, along with the arm 54, are parts of the cake detector assembly 52, and all parts of this assembly will be seen to be movable in response to movement of the piston 50, both in the same direction and in the same amount as the piston 50.

Slidingly disposed in the central bore 82 is an elongate probe rod 56, which is also of generally cylindrical configuration. The rod 56 extends into the vessel 10 a greater distance than does the arm 54, and a first part of this rod 56 is adapted to move into close proximity to the filter plate 22. In the illustrated embodiment, this first part is at the end of rod 56 opposite the air cylinder, where the rod 56 terminates in a flat probe plate 58 that is generally perpendicular to the longitudinally extending rod 56 and hence parallel to the face of plate 22. Longitudinally spaced from the plate 58, a second part of the probe rod 56 is adjacent switch 62. In this embodiment, this second part is at the terminus of rod 56, at end 60, opposite the plate 58. This end 60 of the probe rod, which extends into the switch housing 64, is adapted to throw or actuate the switch 62 from the "off" to the "on" position upon moving into contact therewith.

Intermediate the end 60 and the flat plate 58, the rod 54 contains a shoulder 76, of for example annular configuration, which fits into a suitably shaped enlarged bore or recess 70 in the arm 54. Also fitting into the recess 70 is urging means such as the coil spring 74, such spring being located on the side of shoulder 76 nearest the end 60 of the probe rod. The spring 74 abuts on one end against the arm 54 and on its other end against the shoulder 76 of rod 56. In this manner, the plate 58 on rod 56 is held away from the arm 54 until the force of the spring 74 is overcome by an opposite force acting on the probe plate 58.

Near the housing 64, the rod 56 may have thereon a stroke limit nut 72, which cooperates with a flange portion 66 on the housing 64 to limit the movement of the rod in a direction toward the switch 62. It will be understood that such movement may be limited in any convenient manner, and might for example instead be limited by abuttment of the probe plate 58 against the abutting plate 68 on the arm 54.

At the hole 94 in tank wall 36, a suitable packing gland 80 and other suitable fitting 84 are included to prevent fluid flow from the interior of pressurized vessel 10 through the hole 94. Likewise, one or more sealing means such as the O-ring seals 78 are desirably included between the rod 56 and arm 54.

The operation of the present invention may be understood by reference to FIGURES 2 through 4. As explained above, the cake detector assembly 52 moves as a unit, longitudinally upon movement of the piston 50 of air cylinder 38. As the piston moves toward the end of cylinder 38 nearest the vessel 10, the cake detector assembly moves toward the filter plate 22 nearest the tank wall 36. The apparatus is positioned so that the flat plate 58 on the rod 56 will come very close to the filter plate 22 when the piston 50 is in its position nearest the filtering vessel 10. This orientation of the apparatus may be seen in FIGURE 2.

Then, as the piston moves away from the filtering vessel, as by introduction of air through the air inlet 46, the cake detecting apparatus, including the rod 56 and arm 54, move away from the filter plate 22 toward the wall 36 of the vessel. Continued movement in this direction places the apparatus in the position illustrated in FIGURE 3.

This inward and outward longitudinal movement of the cake detecting apparatus is continued at any desired rate, for example 2 or 3 times per minute. All the time, of course, the filtration process is continuing and filter cake is building up on the filtering means around each of the filter plates 22. It is noted that filter cake builds up on each of the various plates at about the same rate since the entire vessel is under the same pressure. This means that a detection of the amount of cake buildup on one plate will be an effective measure of the cake buildup on all the plates.

The filter cake on the filter plate 22 finally builds up to such a point that, when the probe 58 is advanced to its innermost position in the tank, the flat area of probe 58 will encounter the cake 88 which has now built up on the plate 22. When the plate 58 encounters sufficient resistance from the filter cake 88, a force will be exerted (i.e., the resistive force acting against the inward movement of the piston 50) against the spring 74 to compress the spring, and move the end 60 of rod 56 against the switch 62, thereby tripping the switch to the "on" position.

The apparatus may be positioned in the filtering vessel, and the air cylinder strokes so set, that actuation of the switch may be accomplished at any desired cake thickness. In this manner, the setting may be adjusted so that the switch may be actuated upon the thickness of the cake reaching a predetermined amount.

It will be understood that the entry of air into and exit of air from the air cylinder may be accomplished in any desired manner, for example by means of the valve 96, and the air lines 98 and 100 communicating with the air inlet ports 46 and 48, respectively. Air line 102, on the opposite side of valve 96, may conveniently be connected to a suitable source of air (or other suitable fluid) under pressure. In this manner, fluid may be selectively introduced into the cylinder on either side of the piston 50, and of course an automatic timer may be included for timed regulation of the piston movement.

Movement of the probe 56 against the switch may be limited by suitable means such as the action of limiting nut 72 against the flange 66, or if desired, movement of the plate 58 against the abutting plate 68 (as shown in FIGURE 4).

It will be understood by those skilled in the art that the apparatus may be so constructed that actuation of the switch to the "on" position may cause a warning light to come on, or a buzzer to sound, or may actuate washing means inside the vessel 10 to automatically wash the accumulated filter cake from the filter plates.

Removal of the cake 88 from the filter plate, or else withdrawal of the probe 58 from contact with the filter cake, will result in return of the switch to the "off" position.

In the above manner, an accurate and efficient means is provided for determining the cake thickness on a filter plate, without necessitating the opening of the filtering vessel. Further, means is provided for automatically removing the filter cake upon sufficient cake buildup without ever opening the filtering vessel.

Although the invention has been described in terms of a particularly advantageous embodiment, it will be understood by those skilled in the art that various changes in the structures illustrated herein may be made without departing from the scope of the invention, which is defined by the appended claims. For example, whereas in this embodiment the motive means has been illustrated as a hydraulic cylinder, it is understood that any convenient motive means might be employed, for example an electrically operated cam.

What is claimed is:

1. In combination with a vessel suitable for filtering fluids, having at least one filter plate upon which filter cake is deposited during the filtering operation, means for detecting the buildup of said filter cake comprising:
   a probe member disposed in a nonparallel relationship with said filter plate, and adapted for movement longitudinally toward and away from said filter plate, said probe member having
      a first part adapted to move into close proximity with said filter plate, and
      a second part longitudinally spaced from said first part;
   a switch adjacent said second part and adapted for longitudinal movement with said probe member;
   urging means for preventing said probe member from moving into contact with said switch; and,
   motive means for moving said probe member and said switch longitudinally, said probe member upon encountering sufficient resistance from buildup of filter cake on said filter plate when moved into close proximity to said filter plate, having means operable to overcome said urging means to thereby move against said switch to actuate said switch.

2. In combination with a vessel suitable for filtering fluids under pressure, having at least one filter plate upon which filter cake is deposited during the filtering operation, means for detecting the buildup of filter cake comprising:
   a cylindrical probe member extending through a wall of said vessel and disposed in nonparallel relationship with said filter plate, said probe member being adapted for movement longitudinally toward and away from said filter plate, and having
      a first end adapted to move into close proximity with said filter plate, and provided with means for encountering resistance from filter cake buildup, and
      a second end longitudinally spaced from said first end;
   a switch adjacent said second end and adapted for longitudinal movement in the same direction and in the same amount as said probe member;
   urging means for preventing the second end of said probe member from moving into contact with said switch; and,
   motive means for moving said probe member and said switch longitudinally, said probe member upon encountering sufficient resistance from buildup of filter cake on said filter plate when moved into close proximity to said filter plate, having means operable to overcome said urging means to thereby move longitudinally toward said switch, whereupon said switch is actuated by movement of said second end of probe into contact therewith.

3. Apparatus according to claim 2, wherein said means for encountering resistance from filter cake buildup comprises a flat plate generally parallel to said filter plate.

4. Apparatus according to claim 2, wherein said probe member is disposed generally perpendicular to said filter plate.

5. Apparatus according to claim 2, wherein said urging means comprises a coil spring.

6. Apparatus according to claim 2, wherein said motive means comprises a hydraulic cylinder.

7. Apparatus according to claim 6, wherein said hydraulic cylinder is an air cylinder.

8. In combination with a vessel suitable for filtering fluids under pressure, said vessel having at least one filter plate upon which filter cake is deposited during the filtering operation, means for detecting the buildup of filter cake comprising:
   a detector probe assembly disposed at least partially in said vessel and in nonparallel relationship with said filter plate and adapted for movement longitudinally toward and away from said filter plate, including
      a generally cylindrical arm member having a bore along the central longitudinal axis thereof,
      a probe member slidingly disposed in said bore,
      urging means between said arm member and said probe member, tending to prevent said probe member from moving into contact with said switch; and,
      a switch disposed adjacent said probe member and adapted to be actuated upon contact therewith;
   motive means for moving said detector probe assembly longitudinally toward and away from said filter plate, whereupon sufficient buildup of filter cake on said filter plate will cause said probe member to meet sufficient resistance to slide in said bore and move into contact with said switch, causing said switch to be actuated to thereby give notice of filter cake buildup.

9. Apparatus according to claim 8, wherein the end of said probe member opposite said switch is provided with a generally flat plate substantially parallel to said filter plate, which plate is effective for encountering resistance from buildup of filter cake upon being moved into contact therewith.

10. Apparatus according to claim 8, wherein said switch is disposed in a housing.

11. Apparatus according to claim 8, wherein said detector probe assembly is disposed substantially perpendicular to said filter plate.

12. Apparatus according to claim 8, wherein said arm member includes an enlarged bore around the central axis thereof, and said urging means comprises a coil spring disposed in said enlarged bore.

13. Apparatus according to claim 12, wherein said probe member has a shoulder thereon adapted to fit into the enlarged bore of said arm member, and one end of said coil spring acts against said shoulder.

14. Apparatus according to claim 8, wherein said motive means comprises a hydraulic cylinder.

15. Apparatus according to claim 14, wherein said hydraulic cylinder is an air cylinder.

References Cited
UNITED STATES PATENTS

| | | | |
|---|---|---|---|
| 2,467,409 | 4/1949 | Smith | 210—86 |
| 2,799,397 | 7/1957 | Berline | 210—86 X |
| 3,077,988 | 2/1963 | Anderson et al. | 210—86 |
| 3,322,277 | 5/1967 | Bearson et al. | 210—86 X |

REUBEN FRIEDMAN, *Primary Examiner.*

J. ADEE, *Assistant Examiner.*

U.S. Cl. X.R.

210—106, 332